United States Patent
Bury

(10) Patent No.: US 9,197,729 B2
(45) Date of Patent: Nov. 24, 2015

(54) METHOD FOR OPERATING A MOBILE TELEPHONE

(71) Applicant: Bury Sp.z.o.o., Mielec (PL)

(72) Inventor: Henryk Bury, Loehne (DE)

(73) Assignee: Bury Sp.z.o.o., Mielec (PL)

( * ) Notice: Subject to any disclaimer, the term of this patent is extended or adjusted under 35 U.S.C. 154(b) by 0 days.

(21) Appl. No.: 13/764,985

(22) Filed: Feb. 12, 2013

(65) Prior Publication Data
US 2013/0210499 A1 Aug. 15, 2013

(30) Foreign Application Priority Data
Feb. 13, 2012 (DE) .......................... 10 2012 002 618

(51) Int. Cl.
*H04M 1/00* (2006.01)
*H04M 1/60* (2006.01)

(52) U.S. Cl.
CPC .................................... *H04M 1/6091* (2013.01)

(58) Field of Classification Search
CPC .......... H04M 3/42; H04M 1/00; H04M 9/00; G06F 3/041; H04B 7/00; H04Q 7/22; H04W 4/06
USPC ............... 455/41.2, 569.1, 569.2, 445, 575.9, 455/415, 450, 556.1; 345/173
See application file for complete search history.

(56) References Cited

U.S. PATENT DOCUMENTS

| | | | |
|---|---|---|---|
| 6,031,492 A * | 2/2000 | Griffin et al. | 343/702 |
| 8,731,627 B2 * | 5/2014 | Inabathuni et al. | 455/575.9 |
| 2004/0121819 A1 | 6/2004 | Vogel | |
| 2006/0223592 A1 | 10/2006 | Kouno | |
| 2009/0054069 A1 | 2/2009 | Calnan, III et al. | |
| 2010/0112994 A1 * | 5/2010 | Tamura | 455/415 |
| 2011/0227843 A1 * | 9/2011 | Wang | 345/173 |
| 2012/0252475 A1 * | 10/2012 | Farrell et al. | 455/450 |

FOREIGN PATENT DOCUMENTS

| | | |
|---|---|---|
| DE | 19939631 A1 | 2/2001 |
| DE | 10042004 A1 | 3/2002 |
| DE | 10308897 | 10/2004 |
| DE | 10308897 A1 | 10/2004 |
| DE | 202011003984 | 8/2011 |
| DE | 202011003984 U1 | 8/2011 |
| EP | 1 119 160 A2 | 1/2000 |
| EP | 1388994 A2 | 2/2004 |
| EP | 1404025 A1 | 3/2004 |
| WO | 98/57434 A1 | 12/1998 |
| WO | 2006/067541 A1 | 6/2006 |

* cited by examiner

*Primary Examiner* — Amancio Gonzalez
(74) *Attorney, Agent, or Firm* — Whitham, Curtis, Christofferson & Cook PC; Michael Whitham; Timothy Miller

(57) ABSTRACT

The invention relates to a method for operating a mobile telephone in a motor vehicle having a handsfree device installed in the motor vehicle, wherein
the mobile telephone has a display device, and
the handsfree device has an electrical controller,
whereas information is sent from the mobile telephone to the electrical controller, is processed therein and is then sent to the mobile telephone before being displayed on the display device.

10 Claims, 1 Drawing Sheet

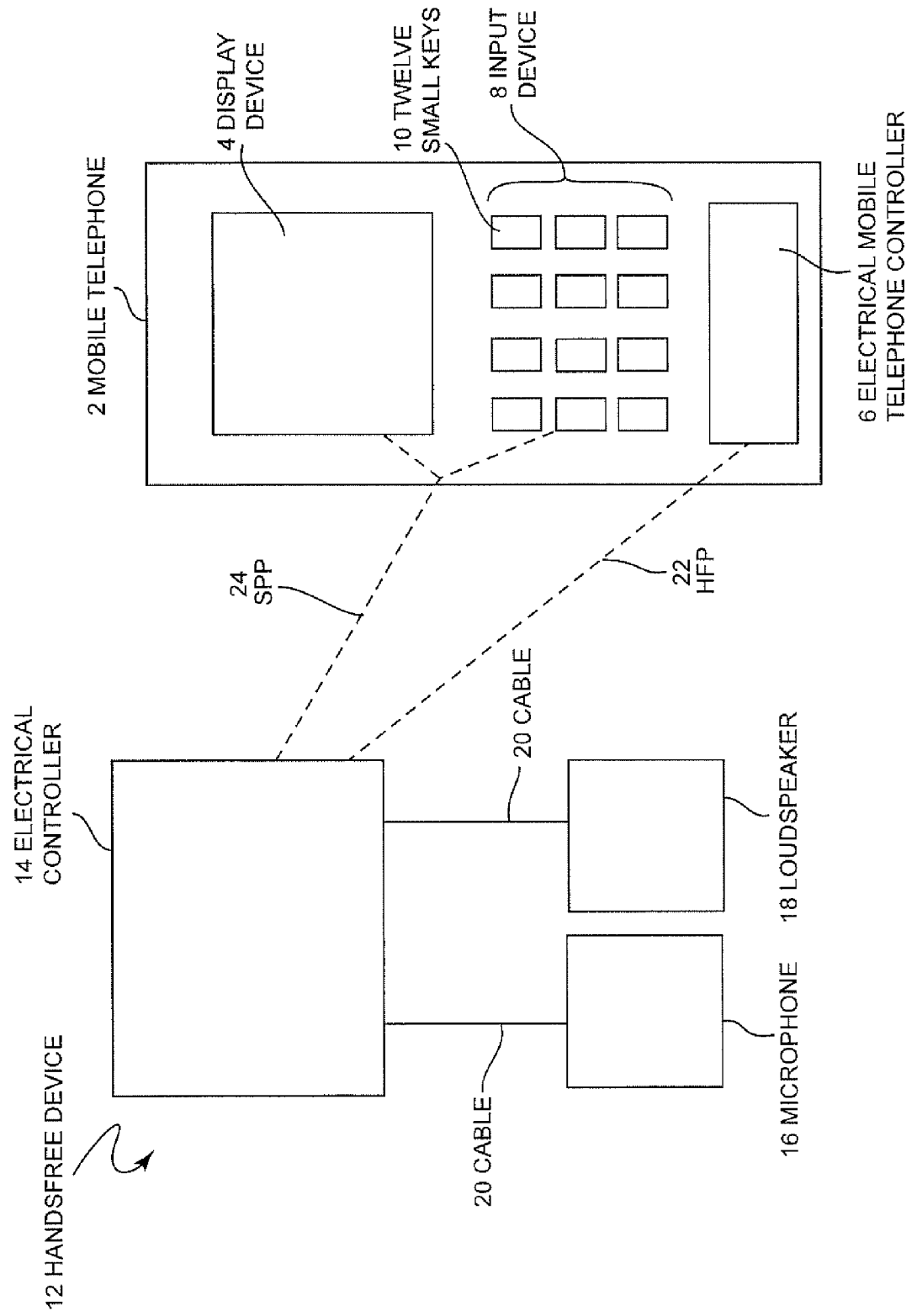

METHOD FOR OPERATING A MOBILE TELEPHONE

The invention relates to a method for operating a mobile telephone in a motor vehicle, and to a handsfree device and a mobile telephone for use in such a method.

Many motor vehicles, particularly in the low-price segment, are not equipped with a preinstalled handsfree device by the manufacturer today. In many cases, such handsfree devices are available as separate upgrade sets. A handsfree device of this type usually comprises a central control unit which contains the electrical controller, which mostly comprises a micro processor and a memory element for electronic data storage. In addition, the handsfree device has at least one loudspeaker and at least one microphone, each of which are connected to the central control unit. In addition, a display device, usually an indirectly or directly connected display, is part of the handsfree device. Said display is often arranged in the motor vehicle by means of a bracket, provided specifically for this purpose, such that it is arranged so that the driver of the motor vehicle can easily see and easily access it.

If the aim is thus to operate a mobile telephone within the motor vehicle using a handsfree device of this type, it is necessary to set up communication between the mobile telephone and the central control unit. This can be accomplished wirelessly or by wire. When information, for example about an incoming call, then reaches the mobile telephone, for example from a mobile radio network, the mobile telephone communicates with the central control unit. The latter processes the data and information received and sends appropriate instructions and information to the display device of the handsfree device. The associated display is used to display the information and any available control options.

When a provided operator control element, for example, is then operated on the display device of the handsfree device in order to take the call, an appropriate piece of information about this is sent from the display device to the central control device and from there to the mobile telephone. Conventionally, the communication between the central control unit and the display device of the handsfree device takes place by wire, while the communication between the central control unit and the mobile telephone takes place wirelessly.

One disadvantage is that the display device of the handsfree device is fitted in the interior of the motor vehicle such that it is visible from the outside. In this way, it is a simple matter to tell from the outside whether a motor vehicle contains a retrospectively installed handsfree device. In order to prevent this from prompting the motor vehicle to be broken into, for example, the driver must ensure, upon leaving the motor vehicle, that the display device of the handsfree device is no longer visible. He therefore needs to remove it from the bracket and possibly take it with him or stow it so that it is not visible from the outside, for example in the glove compartment of the motor vehicle. When the driver gets back into the motor vehicle later and wishes to use the handsfree device, he first of all has to unpack the packed or stowed display device of the handsfree device and arrange it in the bracket again. This handling of the handsfree device is inconvenient, time-consuming and therefore not very user friendly.

DE 103 08 897 A1 discloses the practice, in a motor vehicle which has an interface for data interchange with a smartphone, of using this smartphone as a display. To this end, the smartphone is connected to the interface for data interchange and is arranged in a bracket provided for this purpose, for example in the dashboard of the motor vehicle. Instead of a small display which is otherwise provided, in this state it is possible to use the display device of the smartphone for controlling motor vehicle functions.

DE 20 2011 003 894 U1 discloses, in contrast thereto, a control system with which, conversely, a display apparatus which is present in the motor vehicle is used in order to control a mobile apparatus, for example a smartphone, in a motor vehicle. To this end, the motor vehicle monitor is connected to the mobile apparatus by means of a signal gateway apparatus, with the result that the mobile apparatus can then be controlled by means of the motor vehicle monitor.

US 2009/0054069 A1 describes a communication protocol which can be used, by way of example, to facilitate the communication between a mobile telephone and another appliance, for example a motor vehicle. However, this refers to the architecture of the communication protocol without describing what information is sent, processed and displayed for the purpose of operating a mobile telephone.

The invention is therefore based on the object of proposing a method for operating a mobile telephone in a motor vehicle and also a handsfree device provided for this purpose and a mobile telephone, with the result that these disadvantages are overcome.

The invention achieves the stated object by means of a method for operating a mobile telephone in a motor vehicle having a handsfree device installed in the motor vehicle, wherein the mobile telephone has a display device, and the handsfree device has an electrical controller, wherein the method is whereas information is sent from the mobile telephone to the electrical controller, is processed therein and is then sent to the mobile telephone before being displayed on the display device.

It has been found to be particularly advantageous if the mobile telephone has an input device, and control signals which are input by means of the input device are sent from the mobile telephone to the electrical controller, are processed therein and are then sent to the mobile telephone before being implemented in the mobile telephone.

A method according to the invention for operating the mobile telephone means that it is no longer necessary for the handsfree device to have a display device. Instead, the display device of the mobile telephone, that is to say the display of the telephone, is used as a display device. Nevertheless, information to be displayed is sent from the mobile telephone to the electrical controller first of all and is displayed on the display device of the mobile telephone only after having been edited in said electrical controller and returned to the mobile telephone.

The same possibly applies to control signals which can be input by means of an input device of the mobile telephone. In one preferred exemplary embodiment, these control signals are also sent to the electrical controller and processed further therein before they are implemented in the mobile telephone. Only following return to the mobile telephone are the control signals converted into the desired actions.

Since the electrical controller continues to be involved in the method, it is possible to retain and continue to use routines, programs and cycles which are stored in said electrical controller and are possibly specific to the motor vehicle. By way of example, such routines may include noise reduction and also muting or at least reduction of the volume of a car radio for the duration of a telephone call.

Preferably, the information is sent from the mobile telephone to the electrical controller on a first channel and from the electrical controller to the mobile telephone on a second channel, and the control signals are sent from the mobile telephone to the electrical controller on the second channel and from the electrical controller to the mobile telephone on the first channel. In this case, the individual channels may be provided as different wires in a common cable or as different channels, for example different Bluetooth profiles, for wireless transmission, for example. It is thus possible to use different frequencies or codings or different Bluetooth profiles in order to separate the individual channels from one another. Advantageously, the information and/or control signals is/are sent from the mobile telephone to the electrical controller and/or from the electrical controller to the mobile telephone by means of a wireless link. It is naturally conceivable for a wired link to be provided for transmitting information and/or signals from the electrical controller to the mobile telephone, for example, while a wireless link is provided for the transmission in the opposite direction. However, the much more convenient, and, particularly for the user, more agreeable refinement provides a wireless link in both transmission directions. As already explained, the different channels can be defined by different frequency bands or different codings or different Bluetooth profiles, for example.

When a wireless link is implemented in both transmission directions, it is, in particular, not necessary to set up any plug connections or cable connections between the electrical controller, which may be installed in the motor vehicle, for example, and a mobile telephone of the user. Therefore, the effort involved for commissioning the handsfree device or for carrying out the method is extremely low.

With particular preference, the wireless link is a Bluetooth link. However, all other wireless links, such as WLAN, are also conceivable.

Advantageously, a supplementary antenna is used for communication between the mobile telephone and a telephone network. This may be provided in the form of an adhesive antenna, for example, which is arranged on a windshield of the motor vehicle. There may also be provided supplementary antennas arranged externally on the car, for example by means of magnetic fixings, in order to allow the communication between the mobile telephone and the telephone network.

The actual telephony signals which are used for telephoning by means of the mobile telephone and the handsfree device installed in the vehicle are advantageously sent from the mobile telephone via the electrical controller to a loudspeaker and from a microphone via the electrical controller to the mobile telephone. The at least one loudspeaker and the at least one microphone are in this case preferably part of the handsfree device which is installed in the motor vehicle.

A handsfree device according to the invention is suitable for use in a method of this type. In particular, the electrical controller, which may be arranged in the central control unit, for example, is set up in order to allow the desired data transmissions which are necessary for the method.

A mobile telephone according to the invention has an electrical mobile telephone controller which is set up to execute a program stored in a memory of the mobile telephone, with the result that the mobile telephone can be used in one of the methods described. Advantageously, the display device of the mobile telephone is a touchscreen which is simultaneously the input device. This further simplifies the method, further reduces the number of components and operator control elements required and simplifies telephoning using the mobile telephone from the motor vehicle.

The program that is present in the memory of the mobile telephone, and that is executed for the purpose of using the mobile telephone in the method, can be provided in the form of an app, for example, that is to say a downloadable program which is not part of the standard scope of the mobile telephone software. In this way, it is possible to use conventional mobile telephones, particularly smartphones, many of which are equipped with an advantageous touchscreen, for the described method in a motor vehicle.

This app that is installed on the mobile telephone therefore allows an installed handsfree device according to the invention to be used to use the mobile telephone without further additional hardware in the motor vehicle. In particular, it is also not necessary to use any headsets or other headphones which can communicate with the mobile telephone by means of Bluetooth, for example.

An exemplary embodiment of the present invention is explained in more detail below with reference to a drawing, in which FIG. 1 shows the schematic illustration of the transmission of information and control signals in a method based on an exemplary embodiment of the present invention.

FIG. 1 shows the schematic illustration of a mobile telephone 2 which has a display device 4, an electrical mobile telephone controller 6 and an input device 8, which comprises twelve small keys 10 in the exemplary embodiment shown in FIG. 1.

In addition, FIG. 1 shows the schematic illustration of a handsfree device 12 which has an electrical controller 14. This electrical controller 14 is connected to at least one microphone 16 and at least one loudspeaker 18. In the exemplary embodiment shown in FIG. 1, the connection between the electrical controller 14 and the microphone 16 or the loudspeaker 18 is made by means of a cable 20 in each case.

When the mobile telephone 2 now receives information via its antenna, which is not shown, for example from a mobile radio network, the electrical mobile telephone controller 6 uses a first channel 22, which may be an HFP Bluetooth profile (HFP: handsfree profile), for example, to send this information to the electrical controller 14 of the handsfree device 12. Within this electrical controller 14, the information is processed and returned to the mobile telephone 1 by means of a second channel 24, which may be an SPP Bluetooth profile (SPP: serial part profile), for example. FIG. 1 shows that the second channel 24 is connected to the display device 4. This is used to show that the information sent by means of the second channel 24 by the electrical controller 14 of the handsfree device 12 is displayed on the display device 4 of the mobile telephone 2. Naturally, the information is first of all processed in the electrical mobile telephone controller 6 before being transmitted from there to the display device 4 and being displayed thereon. For the sake of better clarity, this type of illustration has been dispensed with and the second channel 24 has been connected directly to the display device 4 in FIG. 1.

The keys 10 of the input device 8 of the mobile telephone 2 are used to produce control signals in order to prompt particular actions by the mobile telephone 2. By way of example, this may be the taking of a call or the sending of a call. These control signals are sent to the electrical controller 14 of the handsfree device 12 by means of the second channel 24, which is connected not only to the display device 4 but also to the keys 10 or other control elements. The second channel 24 is therefore connected to one of the keys 10 of the input device 8 in FIG. 1. This simplified illustration is also used for better clarity. The signals produced by the keys 10 are first of all processed in the electrical mobile telephone controller 4 before being sent by means of the second channel 24. The control signals are processed within the electrical controller 14 of the handsfree device 12 and are then forwarded by means of the first channel 22 to the electrical mobile telephone controller 6, in which they are processed. The latter initiates and executes the desired actions.

The electrical mobile telephone controller 6 has a memory unit, which is not shown, within which there is a program, for example in the form of an app, which is required for carrying out the method. This app can be provided in downloadable form, with the result that various mobile telephones can be upgraded for this purpose and hence used in a method according to the present invention. Naturally, the display device 4 and the input device 8 of the mobile telephone 2 do not have to be present in a form with such physical separation as shown in FIGS. 1 and 2. Instead, it is naturally conceivable for the mobile telephone 2 to have a touchscreen, for example, in which both the display device 4 and the input device 8 are implemented.

The handsfree device 12 with the at least one microphone 16 and the loudspeaker 18 is installed in a motor vehicle which is not shown in the figures. In this case, the electrical controller 12, which may be integrated in a separate box, for example, is in most cases arranged in the motor vehicle such that it is not visible from the interior of the motor vehicle and hence is not irritatingly apparent. The same applies to the at least one microphone 16 and the at least one loudspeaker 18, which may be arranged in the interior of the motor vehicle inconspicuously and in concealed fashion as appropriate.

The invention claimed is:

1. A method for operating a mobile telephone in a motor vehicle having a handsfree device installed in the motor vehicle, wherein
   the mobile telephone has a display device, and
   the handsfree device has an electrical controller, the method comprising the steps of:
      receiving information by the mobile telephone from a telephone network;
      sending the information from the mobile telephone to the electrical controller;
      processing the information by the electrical controller;
      sending the processed information then to the mobile telephone; and
      displaying the processed information on the display device of the mobile telephone after said step of sending the processed information to the mobile telephone.

2. The method according to claim 1, wherein the mobile telephone has an input device, and further comprising the steps of:
   sending control signals, which are input by means of the input device, from the mobile telephone to the electrical controller;
   processing the control signals by the electrical controller; and
   sending the processed information to the mobile telephone before being implemented in the mobile telephone.

3. The method according to claim 1 further comprising the steps of:
   sending the information from the mobile telephone to the electrical controller on a first channel;
   sending the information from the electrical controller to the mobile telephone on a second channel, and
   sending control signals from the mobile telephone to the electrical controller on the second channel; and
   sending the control signals from the electrical controller to the mobile telephone on the first channel.

4. The method according to claim 1 further comprising the step of:
   sending one or more of the information and control signals from the mobile telephone to the electrical controller and/or from the electrical controller to the mobile telephone by means of a wireless link.

5. The method according to claim 4, wherein the wireless link is a Bluetooth link.

6. The method according to claim 1, wherein a supplementary antenna is used for communication between the mobile telephone and the telephone network.

7. The method according to claim 1 further comprising the steps of:
   sending telephony signals from the mobile telephone via the electrical controller to a loudspeaker; and
   sending telephony signals from a microphone via the electrical controller to the mobile telephone.

8. A handsfree device for operating a mobile telephone having a display device in a motor vehicle comprising:
   an electrical controller configured to
      process information sent from a telephone network through the mobile telephone,
      perform one or more routines selected from the group consisting of noise rejection and reduction of a car radio volume, and
      send the processed information to the mobile telephone for display of the processed information on the display device of the mobile telephone; and
   cable connections to at least one of microphones and loudspeakers.

9. An electrical controller of a handsfree device for operating a mobile telephone in a motor vehicle, the electrical controller being configured to execute the steps of:
   receiving information from a telephone network through the mobile telephone;
   processing the information by the electrical controller;
   performing one or more routines selected from the group consisting of noise rejection and reduction of a car radio volume; and
   sending the processed information to the mobile telephone for display of the processed information on a display device of the mobile telephone,
   wherein the electrical controller is installed in the motor vehicle.

10. The electrical controller according to claim 9, wherein the display device is a touchscreen which functions as an input device.

* * * * *